Aug. 12, 1930.    C. BIRDSEYE    1,773,079
METHOD OF PREPARING FOOD PRODUCTS
Filed June 18, 1927    5 Sheets-Sheet 1

Clarence Birdseye
INVENTOR

By Hector M. Holmes
ATTORNEY

Aug. 12, 1930.  C. BIRDSEYE  1,773,079
METHOD OF PREPARING FOOD PRODUCTS
Filed June 18, 1927  5 Sheets-Sheet 2
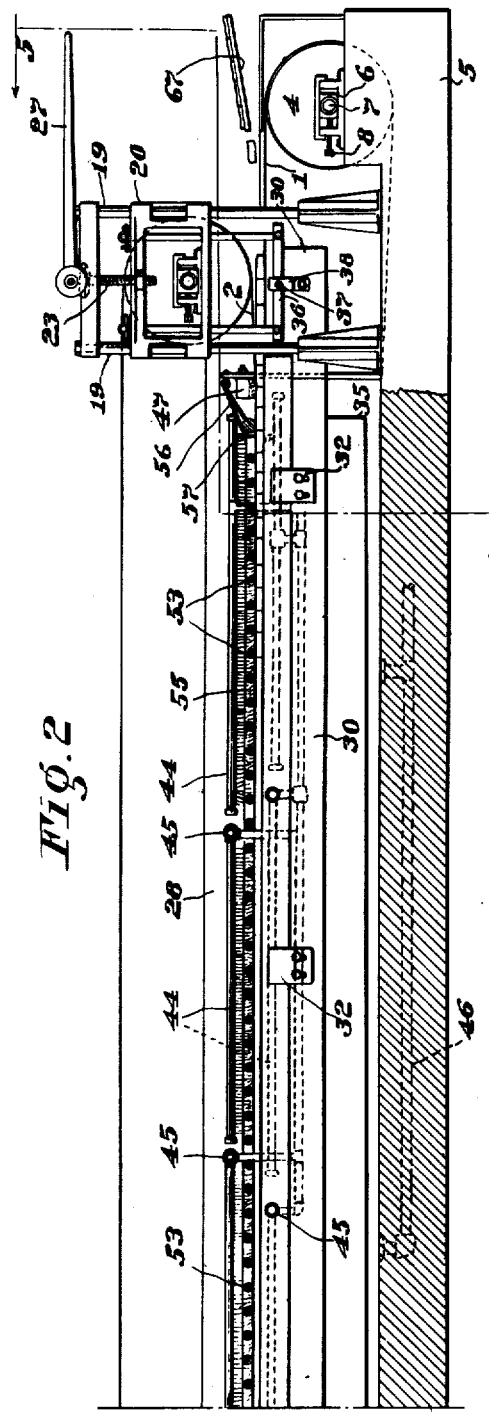
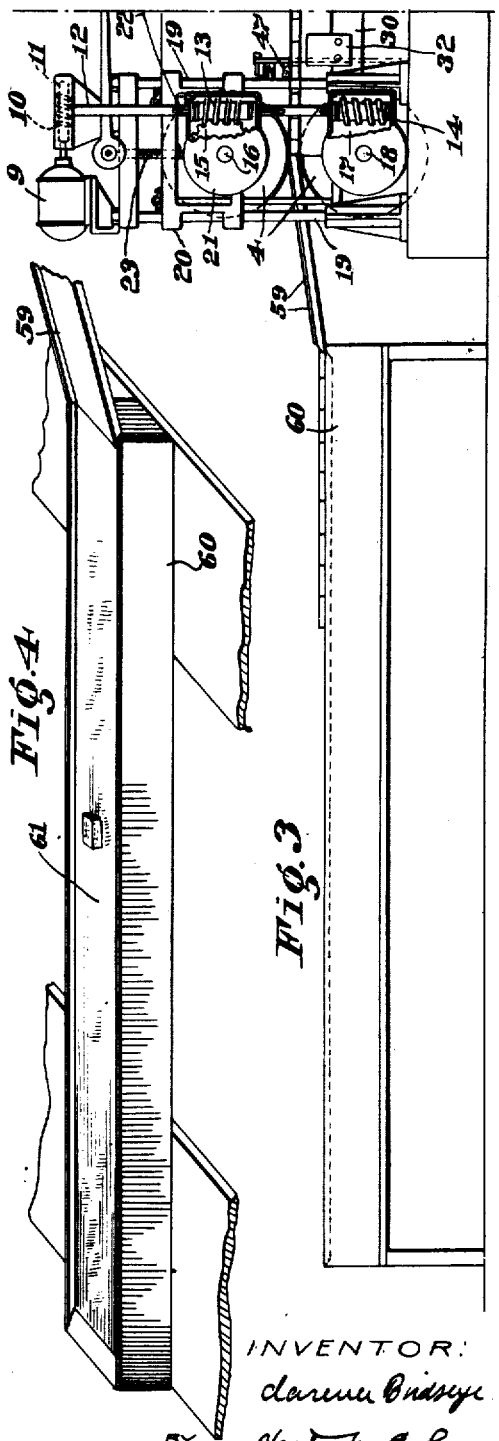

Aug. 12, 1930.   C. BIRDSEYE   1,773,079
METHOD OF PREPARING FOOD PRODUCTS
Filed June 18, 1927   5 Sheets-Sheet 3
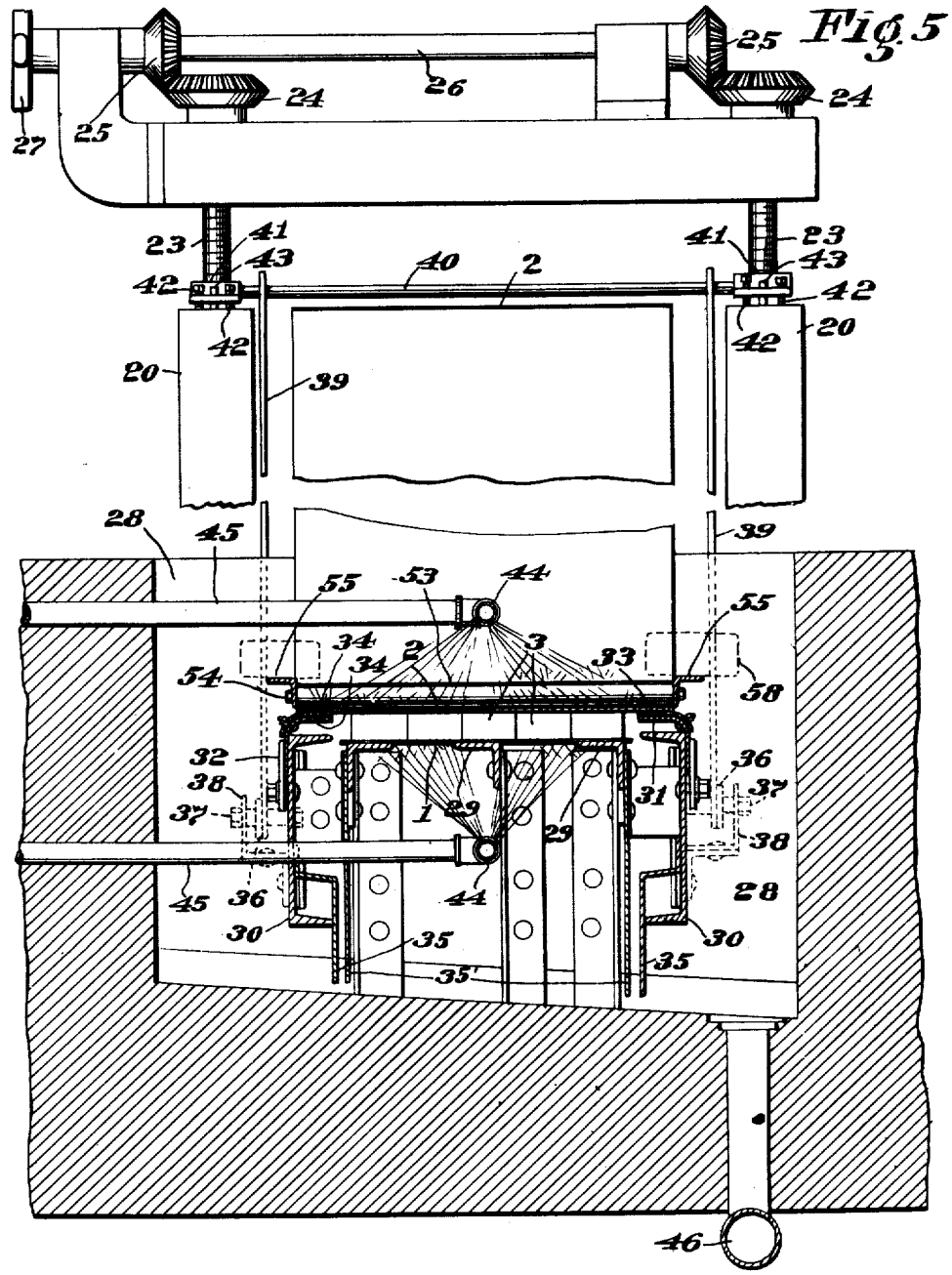
INVENTOR:
Clarence Birdseye
BY
ATTORNEY Aug. 12, 1930.    C. BIRDSEYE    1,773,079
METHOD OF PREPARING FOOD PRODUCTS
Filed June 18, 1927    5 Sheets-Sheet 5
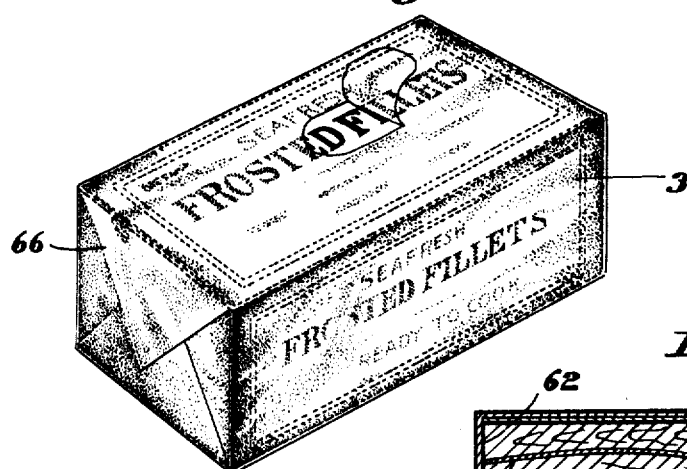
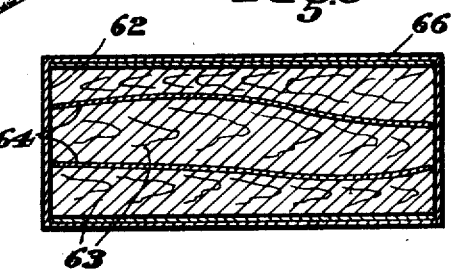
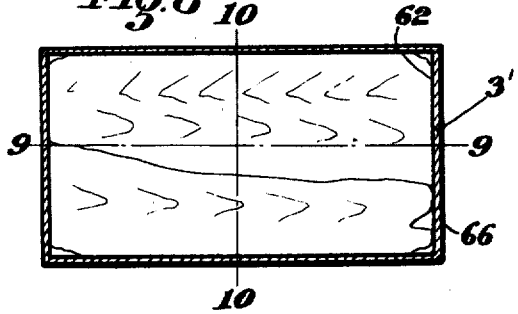
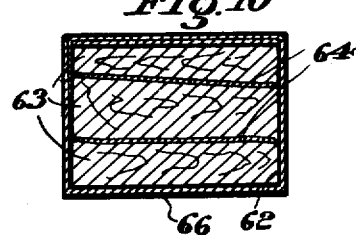
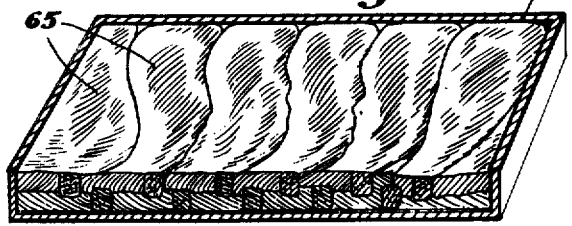
INVENTOR:
Clarence Birdseye
BY
ATTORNEY Patented Aug. 12, 1930

1,773,079

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

METHOD OF PREPARING FOOD PRODUCTS

Application filed June 18, 1927, Serial No. 199,693, and in Australia and New Zealand July 13, 1926.

My invention relates to methods of treating food products by refrigerating the same, preferably by "quick" freezing the product into a frozen block, in which the pristine qualities and flavors of the product are retained for a substantial period after the block has been thawed. In so far as this application contains subject matter disclosed in the applications mentioned below, this application is a continuation in part of my pending applications, Serial No. 40,726, filed July 1, 1925; No. 122,070, filed July 13, 1926; No. 156,277, filed December 22, 1926; and No. 169,211, filed February 18, 1927, as a division of Serial No. 156,277.

My invention has especial value in its application to such comestibles as fish and meat, fresh or cooked, and I will describe the invention as applied thereto, as an example of its utility and advantages, although my invention is not limited in its application to any particular class of comestibles or food products.

A method of freezing which requires more than a very short space of time for freezing impairs the natural qualities and flavors of comestibles. In the case of fish or meat, for instance, slow freezing disrupts the cells of the animal tissue, with loss of the pristine qualities and flavors and rapid deterioration after thawing. By my new method, I am able, by means which are economical and commercially practical, not only to effect any desired degree of refrigeration but to quick freeze a comestible into a compacted frozen block, having comparatively few air spaces, in which the pristine qualities and flavors of the comestible are retained and remain unimpaired for a substantial period after the block has been thawed. Also, I am able to produce such a quick frozen block, frozen in the package or container in which it is to be marketed. Furthermore, I am enabled to quick freeze the product into the desired block by the use of freezing fluids, without any direct contact between the fluid and the package or article being frozen.

My invention constitutes a novel departure in methods of preparing and marketing food products, and, so far as I am aware, has for the first time produced as a practical, commercial article of commerce, a compacted quick frozen block of comestibles, preferably frozen in the package in which it is to be marketed, which frozen block can be stored for a long period of time and transported and marketed at a distance, and then, after being thawed, reassumes its original condition as before freezing. These results and advantages, together with others which will subsequently appear, are effected by my new method.

As a preferred way of preparing a block of frozen, dressed fish, for instance, by my new method, I first form the fish into a compact block or slab, thereby consolidating it and freeing the mass of air as much as possible. The less the air, the more rapidly and efficaciously the block may be frozen, and the less the bacteria held in the frozen block. Preferably, the block is encased in the wrapper or carton in which it is later marketed. It is an advantage to make the block comparatively thin, because it is more readily frozen throughout its mass.

I next freeze the block of fish so rapidly and at such a low temperature that the cells of the fish tissue are substantially unbroken, whereby the pristine qualities and flavors are retained and persist for a substantial time after thawing. Indeed, when prepared in this manner, the food product after thawing returns substantially to its original condition, as if it had never been frozen.

As an example of quick freezing by the application of my new method, I have attained excellent results in the treating of raw fish and meat, by packing the food in a rectangular carton, the mass being about two inches thick, thus producing a block comparatively free of air, and squeezing the block between metal plates, which may be and preferably are in the form of opposed imperforate conveyor belts and simultaneously quick freezing the packaged block by maintaining the metal plates at a temperature of 20° to 50° below 0° F. The block will be completely frozen in about one hour and one quarter. By squeezing the block between the metal plates, the block is compacted, any unevennesses are flattened out so that the product presents flat surfaces of substantial area immediately juxtaposed against the sides of the carton with which the metal plates are in contact. This insures a minimum of insulating air layers or spaces and a heat conductive contact over a substantial portion of the surface area of the block with conduction of heat from at least two sides of the compressed block, which insures uniform and complete freezing in the minimum of time. Preferably I maintain the plates at the desired temperature by applying a cooling fluid thereto, and at the same time provide means whereby the fluid cannot itself come in contact with the package. When the package has remained in freezing contact with the plates a sufficient period of time, it is withdrawn and is ready for marketing. It can be stored for a long period of time, and transported and marketed at a distance, and then, after being thawed, will be found in its original condition as before freezing, in that the natural qualities and flavors of the original food are retained and the product will not desiccate or decay any more rapidly than the original product before freezing.

I will now describe an example of a preferred process of treating certain food products in accordance with my new method and will describe the process in connection with a novel form of apparatus which I have devised and which preferably is used in practicing the method although it will be understood that other means and forms of apparatus may be used.

Referring to the accompanying drawings, in which like numerals of reference indicate similar parts throughout the several views;

Figure 2 is a side elevation partly in longitudinal section of the feed end and central portions of said apparatus;

Figure 3 is a side elevation in continuation of Figure 2, showing the discharge end of the apparatus;

Figure 4 is a perspective view of the package receiving trough at the discharge end of the apparatus;

Figure 5 is a cross-sectional view, partly in end elevation, as upon line 5—5 of Figure 2;

Figure 7 is a perspective view of a completed package prepared in accordance with my invention;

Figure 8 is a horizontal cross-sectional view of said package immediately beneath the cover;

Figures 9 and 10 are cross sectional views on lines 9—9 and 10—10 respectively of Figure 8; and Figure 11 is a perspective and cross-sectional view of another package.

Figure 1:
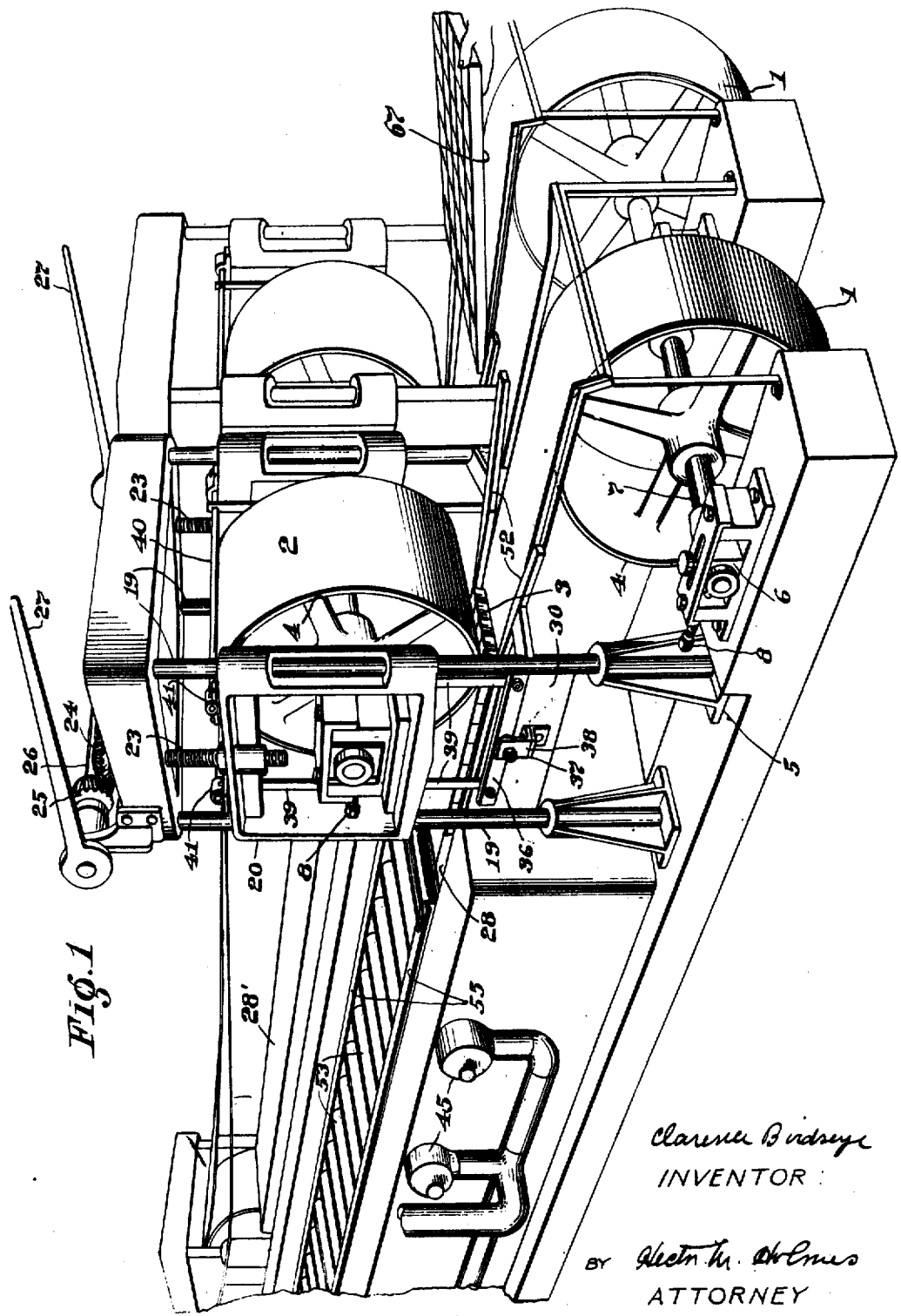
Figure 1 is a perspective view of an apparatus constructed in accordance with my invention, looking at the front or feed end thereof (in this view the cover is removed from the freezing chamber of the nearer machine and the spray pipes for the upper conveyor are not shown)

In the specific embodiment of the apparatus illustrated in said drawings, the reference numeral 1 indicates a lower belt conveyor, substantially parallel to which and above which is an upper belt conveyor 2. The article to be refrigerated, shown in the drawing as a food product packed in cartons 3, preferably of substantially uniform height, is carried from one end of the machine to the other between the upper reach of the lower conveyor 1 and the lower reach of the upper conveyor 2. It is to be understood that said conveyors each pass around appropriate drums or wheels 4, so as to provide for continuous operation in one direction, and also that the lower reach of the upper conveyor and the upper reach of the lower conveyor are both moving at substantially the same speed in the same direction. As the apparatus is preferably constructed, the upper conveyor is shorter than the lower conveyor, thus affording accommodation at the end at which the article is introduced, to deliver said article to the lower conveyor without interference by the upper conveyor. After said article has been delivered to the lower conveyor, it then passes beneath the upper conveyor and in contact with both conveyors. The particular apparatus shown in the drawings, and more especially in Figure 1, is a double machine, that is, one in which there are two pairs of conveyors, but this may be altered to employ only one pair or as many as found necessary or desirable. The two pairs of conveyors are duplicates and from this point on I will refer to and describe the machine as if consisting of only one pair.

The apparatus furthermore includes a suitable framework 5 and adjustable bearings 6 at the feed end of the machine for the axle 7 of the wheel 4 for each conveyor, with tightening means 8 by which proper tension may be applied to the conveyors. The conveyors are preferably actuated simultaneously from a source of power, such as a motor 9 (see Fig. 3), through appropriate drive means. As shown, said motor actuates a worm 10 herein illustrated as upon the motor shaft. Said worm is in mesh with a worm wheel 11 at the upper end of a vertical drive shaft 12. On said vertical drive shaft are worms 13 and 14 for the upper and lower conveyors respectively, upper worm 13 being in mesh with a worm wheel 15 on the axle 16 for the driving wheel or drum of the upper conveyor, and the lower worm 14 is in mesh with a similar worm wheel 17 on the axle 18 for the driving drum of the lower conveyor. Both conveyors will therefore be actuated at the same speed by utilizing worms and worm wheels of the same size and character.

The upper conveyor is preferably arranged to have a vertical adjustment, this adjustment being substantially the same at both ends of the machine as shown. The framework includes two pairs of vertical guide rods or slideways 19 at each end of the machine, the four guide rods at each end of the machine supporting two vertically adjustable housings or riders 20, and said housings or riders providing appropriate bearings at opposite sides for the axle of the conveyor drum. At the drive end of the machine each housing 20 includes a gear case 21 for the upper worm 13 and its worm wheel 15. The drive shaft 12 and worm 13 have a sliding slot and key engagement 22 of a usual kind, so that as the housing 20 is moved up and down there will be no interference with the operation of said worm and its worm wheel. Vertical adjustment of each housing as a whole is obtained by means of vertical screws 23 at each side of the said housing and operated through bevel gears 24 (Figs. 1 and 5) on the upper end thereof in mesh with co-operating bevel gears 25 on a horizontal cross shaft 26, which in turn has an appropriate operating arm 27 on the outer end thereof. The structure and support for the upper adjustable conveyor and the drive means for both conveyors is such as to afford ready adjustment and a constant driving of the two conveyors in perfect synchronism.

Figure 6:
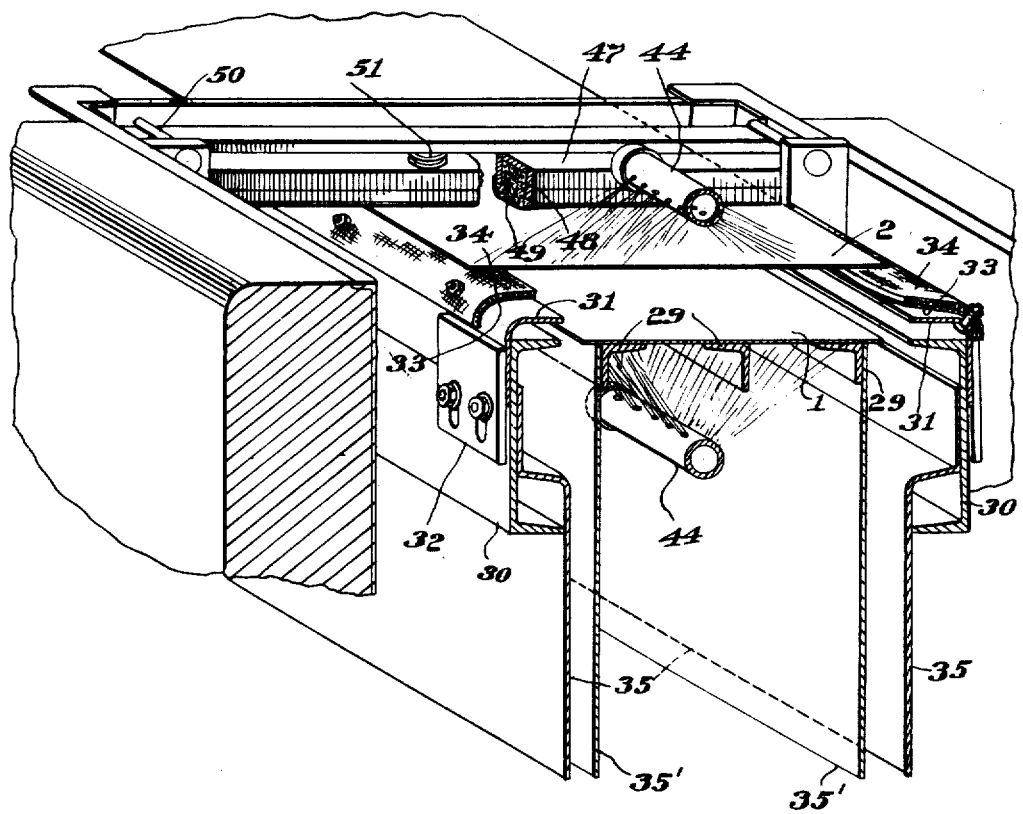
Figure 6 is a cross-sectional isometric view at the discharge end of the freezing chamber.

The lower reach of the upper conveyor and the upper reach of the lower conveyor pass longitudinally through a suitable chamber 28, the walls of which are of heat insulating construction so as to conserve the cooling medium as much as possible and also to aid in the rapidity with which said medium may effect its purpose. Said chamber 28 has appropriate removable top cover 28'. Running through said chamber 28 are longitudinal tracks or supports located beneath the edges of the conveyors, the supports for the upper conveyor being more fully described below, and the supports for the lower conveyor being designated by numerals 29, 29 (Figs. 5 and 6). These supports 29, 29 extend longitudinally under the upper reach of the lower conveyor in a horizontal plane and close enough together to permit a considerable pressure to be applied to the conveyor or belt without bending or flexing the same.

Support for the lower reach of the upper belt is herein shown as comprising a pair of channel irons 30, 30, which run parallel to each other, and substantially under the longitudinal edges of said belt as shown in Fig. 6. Along the longitudinal upper margin of the side wall of each of said channel irons, I adjustably secure an angle iron support 31, with its depending flange frictionally held to the channel iron 30 at intervals by clips 32, thus enabling the upper flange of support 31 to be adjusted quite accurately in a longitudinally horizontal position, even though channel irons 30, 30 may sag or otherwise be out of true horizontal alignment. The said upper flange of support 31 projects inwardly over the top of said channel iron support 30. Preferably the juncture between the vertical and horizontal flanges of said angle iron 31 is rounded or curved rather than angular, and on this curved edge and projecting inwardly over the angle iron is secured a resilient or spring metal strip 33, here shown as faced with a strip of fabric 34. The parts are so positioned and related that the margin of the lower reach of the upper belt will rest upon the upper margin of the facing strip 34 and, by its own weight or the application of additional weight, be made to depress the facing strip and spring strip, thus securing constant contact irrespective of irregularities in the belt or support therefor.

The supports are so arranged that liquid on the upper conveyor in flowing off the side edges thereof will be carried also over the outside of said facing strip 34 and on the outside of support 30 and thence drop downwardly past said support 30, which extends below the plane of the lower conveyor, thereby preventing said liquid from entering between said conveyors. The close engagement of the underside of the belt with the fabric strip 34 will prevent the freezing liquid from creeping along the under side of the upper belt and thus gaining access to the space between the belts. As an added precaution, I have shown an apron 35 secured on the inside of the channel support 30 and depending therefrom substantially to the bottom of the chamber 28 to prevent vapor or splash from the upper belt in any way gaining access to the space between the belts.

The weight of the lower belt, to which is added the weight of the articles being frozen, and the pressure of the upper belt, makes a liquid tight contact between the lower belt and its supporting members 29, which prevents the freezing liquid passing beyond these edge supports and thereby getting into the space between the belts. I may also secure an apron 35' to the outside edges of the outside supports 29 and depending therefrom approximately to the bottom of chamber 28 to further prevent liquid, vapor or splash from the lower belt in any way gaining access to the space between the belts. If desired, the aprons 35 and 35' may extend to and make a seal with the bottom of chamber 28 to further avoid any vapor from a freezing liquid gaining access to the space between the belts.

By the means just described, I am enabled to use a cooling solution which would adversely affect the product to be refrigerated if it should come in contact therewith.

The conveyors which I use are preferably imperforate metal belts which shield the article being frozen from any freezing fluid which is being used, and yet the arrangement is such as to enable the conveyors to be in direct contact with the article so as to obtain rapid cooling thereof by conductivity. It may be here noted that the prevention of contact between the freezing liquid and the article being frozen is further aided by employing an upper conveyor of greater width than the lower conveyor.

In the preferred construction of apparatus, the channel supports 30 are carried by hangers from riders or housings 20 so as to be moved up and down with said housings when an adjustment for a different sized article is desired. In carrying out this feature of the invention, the supporting channels 30 are shown as projecting from the end of the refrigerating chamber to a position between the several vertical guide rods at both ends of the machine. Since support for each end of each channel iron 30 is by similar means, only one such support will be described. On the outside of the channel 30, substantially parallel thereto, is a lower bar 36 forming part of said hanger. This bar 36 is shown attached at a central point by a bolt 37 and bracket 38 to said channel support, and at each end of said bar is secured a strap 39 which depends thereto from the previously described housing or rider 20, this support being effected through the agency of a cross rod 40 (Fig. 5) extending across from one of such riders to the other. Each end of each cross rod 40 is adjustably mounted on the rider by being secured to a cleat 41 having elevating set screws 42 at its corners which rest upon the top of the rider for raising said cleat to any desired position. Lateral movement of said cleat is prevented by central vertical studs 43 which are slidable through the cleat and which project upwardly from a fixed position in the rider. By this means, the channel supports 30 may be independently adjusted with respect to the upper belt wheels.

Suitable spray pipes 44 are arranged above the lower reach of the upper conveyor and below the upper reach of the lower conveyor within the chamber 28. In the present showing, these spray pipes are shown in longitudinal sections, with a feed pipe 45 leading to each section, so as to secure an adequate spray under proper pressure of the cooling fluid or medium. Where the fluid is liquid, it is desirable to drain the same off and re-use it, so I have shown the bottom of said chamber as sloping and leading to a suitable drain pipe 46 by which proper disposal of the fluid may be made. If the aprons 35 and 35' make a seal with the floor of chamber 28, additional drain pipes should be used.

It is desirable to prevent the cooling fluid from passing out of the cooling chamber along the upper surface of lower reach of the top belt, and to prevent this from occurring the top pulleys are preferably adjusted with relation to the bottom pulleys so that the distance between the pulleys is greater than the thickness of the product which gives a slight slope to the lower reach of the top belt at both ends. This is shown at the feed end in Fig. 2. This slope tends to cause any fluid on the belt at that position to flow back toward said chamber. More positive means may also be provided for holding the fluid back, such as a transverse wiper 47. This wiper should be of a construction not affected by the severe cold to which it is subjected so as to become stiff and useless. As one practical form of wiper, I have shown in Fig. 6 an inverted box filled with cotton waste or other soft material 48, with the lower side closed by a flexible material 49 such as canvas, with the said canvas in contact across the belt. The wiper box is confined between pieces bolted to the end of the tank by bolts 50 and pressed toward the belt by a spring 51. Such a wiper is preferably used at both the entrance and exit to the chamber 28 for each belt, the one for the upper belt acting upon the upper side of the lower reach, and that for the lower belt acting upon the under side of the upper reach.

At the front or feed end of the machine, it is preferable to extend the lower conveyor forwardly in front of the upper conveyor so as to receive the article thereon before introducing it between said conveyors. At this front or feed end of the lower conveyor, I preferably provided guides 52 (Fig. 1) for automatically centering the article. These guides are preferably arranged one at each edge of the conveyor, sloping inwardly toward each other in the direction of movement of the conveyor. Where the product is of regular shape, as with cartons 3, the guides may be so positioned that the cartons will be pushed together transversely of the belt before entry under the upper belt.

For reasons which I will presently explain, I also preferably provide means herein for obtaining any desired pressure on the upper conveyor and therefore upon the article passing between the conveyors. While the weight of the upper conveyor belt itself may suffice in some instances, I prefer to supplement that weight, which I do in the present showing by use of a plurality of spaced rollers 53 resting upon and supported by the upper surface of the lower reach of the upper belt transversely thereof. Each of said rollers has longitudinally projecting central pintles 54 (see Fig. 5) which enter appropriate holes in the downwardly extending flange of an angle iron 55, said iron being divided into sections which permit corresponding series of rollers to independently adjust themselves to articles of varying thicknesses. Each section of angle iron 55 is loosely hinged to adjacent sections, and the sections are also anchored at the feed end, as by straps 56 extending from a fixed portion of the frame work, to anchor the rollers from moving longitudinally with the belt. This construction makes a floating pressure with a minimum of friction. The rollers are preferably positioned quite close together, and the first one 57, in the series, is also preferably heavier than the rest to secure initial positive action thereof on the article to be refrigerated. Where occasion requires, additional weights 58 (Fig. 5) may be added by resting the same on the horizontal flanges of the angle irons 55.

At the discharge end of the apparatus, I provide, in the present showing, a short chute 59 to a trough 60, arranged herein in alignment with the direction of movement of the article from the conveyors. In said trough I preferably provide a smooth sheet of ice 61, upon which the product will slide with a minimum of friction on leaving the conveyors and chute 59. This acts as a convenient form of reservoir for reception of the articles from the conveyors, and will also serve to clean the bottom of the article from any foreign matter.

As a preferred way of applying my invention, I show its application to the freezing of a packaged food product, such as dressed, fresh fish or meat, whereby said food product is quickly frozen in the package or container in which it is to be marketed. The package preferably comprises a suitable container, such as the cardboard carton 3', which may be and is preferably waxed or otherwise rendered resistive to the passage or absorption of moisture. For further protection, the said container should preferably be lined with, or the contents wrapped in an appropriate waxed paper or other moisture proof material 62. I have attained satisfactory results by the use of a paraffined vegetable parchment paper, which does not disintegrate with exposure to moisture. The paraffin coating resists the passage of moisture and keeps the paper from sticking to the contents. As I prefer to carry out the invention, the container 3' is preferably positioned with the cover open and the protective material 62 placed therein prior to the introduction of the food contents. With the container thus standing open, a layer of the food product is placed in the bottom thereof. If the food product, for instance, is fish fillets, as indicated in Figs. 8 to 10, the fish, either as a single fillet, if of suitable size, or a plurality of fillets if required, is laid into said container. I have endeavored to illustrate in Figs. 8 to 10 of the drawings fish fillets 63 in said container, the first layer being separated from the next layer by a moisture absorbent separator or filler 64, and so on for the several layers which the container will accommodate.

The fillets 63 are of the usual irregular shapes when inserted in the container, and the parts which are too wide to go into the container flat may be crumpled, folded or squeezed to get them in, endeavoring so far as practicable to press the extra width of the fish toward the part of the container where the fish is not so wide. After the several layers and separators are inserted, the moisture proof lining or protective material 62 is laid over the top and the cover closed.

Referring to Fig. 11, there are shown layers of meat chops 65, packed close together for avoiding unnecessary air spaces. The arrangement is furthermore such, that the bones of the chops in the lower row will preferably underlie the meat portions of the row above, and so on, so that when pressure is applied to the package, the contents can give, thereby enabling the contents to be substantially flat against the top and bottom of the container. In this instance, also, the container is provided with the protective lining 62, which is closed over the top of the product when the container is filled, after which the cover of the container is closed. If desired, each chop can be wrapped in such a protective wrapping. In the same manner, steaks, chickens, and any other food product can be similarly packed. Of course, if the product is one such as Hamberger steak, packing in layers may be disregarded, although fillers may be used to form separable units. By filling the carton as completely as possible with the food product or overfilling it, I insure intimacy of contact between the various layers or pieces of food, and between the container and the food, and a minimum of air pockets, so that there may be uniform and rapid heat transference throughout the mass and outward through the container itself.

After performing the steps as above outlined, unless the product is to be marketed very soon after freezing, the container is wrapped, as in a waxed or paraffined paper 66, and this wrapping is substantially hermetically sealed by use of hot plates or otherwise.

I then introduce the packages into the space between the conveyor belts. The filled packages may be loaded into an open ended tray of suitable size, as shown at 67, Fig. 1, from which they can be readily delivered onto the upper reach of the lower conveyor belt and advanced into the space between the two belts, arranged closely side by side and end to end, and thence carried into the freezing chamber. The speed of the conveyors may be adjusted to move the article through the freezing chamber in the length of time necessary for freezing, or the article may be advanced into the chamber by the belts, the belts stopped and the article retained in the chamber the desired length of time, when the belts can be again put in motion to deliver the article from the machine. The vertical position of the upper belt having been adjusted in accordance with the thickness of the package to be treated, the packages as they are carried forward by the lower belt will be engaged by the lower reach of the upper belt. The lower belt offers a substantially unyielding support to the package, and the upper belt is pressed downwardly on the package by its own weight and by the pressure rollers when they are used. The result is that with a product that is comparatively yielding, the mass is compacted, the product will tend to fill any voids in the carton, and any unevennesses are flattened out so that the product presents substantially even flat surfaces of substantial area, immediately juxtaposed against the sides of the carton, with which the belts are in contact. This insures a minimum of insulating air layers or spaces, and a heat conductive contact over a substantial portion of the surface area of the block of food product, which results in effective heat transference throughout the mass of the product, and uniform and complete freezing in the minimum length of time. The character of the package as above described retards any evaporation of the natural moisture of the food product, and any tendency to a loss of moisture from the package is further retarded by the intimate contact of the belts through which moisture cannot pass.

Also, in the course of freezing, the food product will expand, and it is desirable that this natural expansion should, so far as possible, be caused to take place in such manner as to fill out the container and yet not bulge or distort it, in order to increase the intimacy of contact between the various portions of the contents and between the contents and the container, with resulting uniformity and rapidity of freezing, and to insure that the completely frozen package shall not be bulged or distorted, but shall be sightly and regular in shape. This desirable result is insured as herein shown by the holding of the package during the freezing period between the metal belts, which press on the package at top and bottom.

I further find it advantageous to place fillers 34 in the form of absorbent sheets between the layers of the food product in the carton, especially in the case of fish, to absorb any free moisture which may be on the outside of the fish when inserted in the package, or which may become freed either by pressure on the fish or from any other cause. The juice of the fish forms a medium wherein bacteria multiply more rapidly than in the fish flesh, and it is therefore desirable to avoid the presence of such free fish juice in the package. I find that an absorbent grade of cardboard answers this requirement. I may also apply a thin coating of wax to the absorbent sheets, so they will not adhere to the fish, and I find that the wax coating may be sufficiently thin to pass moisture to the cardboard, where it will be absorbed, and yet prevent the sticking of the fish to the sheet. Even if the wax coating is sufficiently thick to repel absorption, the edges of the sheets, which will not be waxed, will absorb the moisture sufficiently to accomplish the desired purpose. The package will therefore be substantially free from free moisture, whether the product reaches the user completely frozen, partly frozen, or entirely thawed.

I have referred in this specification to quick freezing. While I am unable to define quick freezing in terms of exact temperatures or periods of time, the phrase will be readily understood by any one familiar with the freezing of comestibles. Freezing may take place practically instantaneously, as by liquid air, or it may require days, as in the usual refrigeration in refrigerating rooms. In the case of such comestibles as fish or meat, for instance, if the freezing consumes any substantial period of time, the flesh is injuriously affected and it loses its natural flavor and qualities. By quick freezing, I mean freezing in a sufficiently short space of time so that the cells of the food product are not disrupted or broken and whereby the frozen block, throughout its mass, retains its natural qualities substantially unimpaired.

As an example of a satisfactory application of my process with the preferred apparatus above described, I would state that I attain highly satisfactory results in freezing cartons, two inches thick, packed as above described with fresh meat or fish, by passing such packages through the belts of my machine, and permitting each carton or package to remain under pressure in the freezing chamber, which is 37 feet long, about one hour and a quarter, while the belts are being sprayed with calcium chloride of about 33° Baumé, maintained at an average temperature of 45° below 0° F., the freezing fluid being supplied to the belts at the rate of about 200 gallons per minute. Of course, these figures can be varied widely according to circumstances and other freezing mediums can be used.

While I have described my process and apparatus as preferably applied to freezing the product in the container in which it is to be marketed, I can of course apply the same to freezing the product not previously packed in the marketing package. For instance, I may apply my process by forming the products into a block or slab, preferably covered with a wrapping such as paraffin paper, enclosed on four sides by a frame, open at top and bottom, and delivering this framed block into the space between the belts, which will convey the block, in contact at top and bottom with the belts, through the freezing chamber. After freezing, the frozen block can be readily removed from the open frame and stored and marketed in any desired manner. Or I can operate directly on the comestible or food product itself, without any wrapping, packaging or frame.

It will be noted that in my preferred method of applying my invention, I employ packages about two inches thick, whereby the flat sides which the belts engage are not very far apart and of course a thicker or a thinner package may be employed as desired. In order that the product to be frozen shall be quick frozen throughout its mass, the temperature of the heat conductive medium should be adjusted to the thickness of the article or package being treated as, at a given temperature, it takes longer to completely freeze a thick article or package than a thin one.

While the method is preferably employed for freezing, the said method, or substantial and novel parts thereof, may advantageously be employed for quickly refrigerating or chilling the product being treated without actually freezing it, and it is to be understood that such of my appended claims as specify only "refrigerating" are directed to the claimed method whether employed for freezing or merely chilling more or less without freezing.

While I have illustrated and described in detail an example of a prefered manner in which I practice my process, as applied to fresh fish or meat, and have described with particularity a preferred embodiment of an apparatus which I have found useful, I do not desire to be limited to the specific details thus illustrated and described; but intend to cover all methods which fall within the spirit and scope of my invention, as defined in the following claims.

The machine or apparatus disclosed in this application is not claimed herein but is claimed in a divisional application.

Having thus described my invention, what I desire to claim is:

1. A method of packaging and preserving food which consists in first packing the food in the container in which it is to be marketed and freezing the same under pressure applied to substantial surface areas of the packed container.

2. A method of packaging and preserving food which consists in first packing the food in a container, substantially hermetically sealing said container, and freezing the same under pressure applied to substantial areas of the container to form a sealed package of frozen food.

3. A method of packaging and preserving food which consists in first packing the food in a moisture-proof container, substantially hermetically sealing said container, and freezing said food product under pressure applied to substantial areas of the container.

4. A method of packaging and preserving food which consists in first packing said food in the container in which it is to be marketed, placing said packed container between and in contact with refrigerated elements which are good heat conductors and maintaining said elements at a sufficiently low temperature to freeze said product in said container.

5. A method of packaging and preserving food which consists in first packing the same in a container for delivery, placing at least two sides of said packed container in contact with refrigerated elements which are good heat conductors, maintaining said elements pressed firmly in contact with said container and maintaining said elements at a sufficiently low temperature to freeze said product in said container.

6. A method of packing and preserving food which consists in first packing said food in a container for delivery, applying pressure to said container to press upon opposed surfaces of said packed food and freezing said food in said container by conduction uniformly applied over substantially the entire area of said compressed surfaces.

7. A method of packaging and preserving food which consists in first packing a plurality of layers of the same in a container with a moisture absorbent filler between said layers, and freezing said food in the container under pressure applied to substantial surface areas thereof.

8. A method of packaging and preserving food which consists in first packing the same in a container with a moisture absorbent filler between each layer, said filler being surface coated to prevent sticking to the product, and freezing said food in said container under pressure applied to substantial surface areas thereof.

9. A method of freezing a food product which consists in firmly engaging the same under predetermined pressure on two sides between heat conductive members and flowing a refrigerating medium over the outer faces of said members while shielding the food therefrom.

10. The process of preparing a food product which consists in packing the product in the carton in which it is to be marketed and quick freezing said food product in said carton, by conduction applied over substantial surface areas of said carton.

11. The process of preparing a food product which consists in packing the product in the carton in which it is to be marketed, substantially hermetically sealing the packed carton, and quick freezing the product in said sealed carton, by conduction applied over substantial surface areas of said carton.

12. The process of preparing a food product which consists in packing the product in the carton in which it is to be marketed, surrounding the product in the carton with a moisture-proof lining, substantially hermetically sealing the packed carton, and quick freezing the product in said sealed carton.

13. The process of preparing a food product which consists in packing the product in the container in which it is to be marketed, placing the packed container between heat conductive members which engage the same over a substantial portion of its surface area, and maintaining said members at a temperature sufficiently low to quick freeze the product in said packed container.

14. The process of preparing a food product which consists in packing the product in a container, placing the packed container between heat conductive members which engage opposite faces thereof, subjecting the packed container to pressure, and maintaining said members at a temperature sufficiently low to quick freeze the product while under pressure.

15. A process of preparing a food product which consists in packing the same in a container, filling said container so as to insure a minimum of air voids, pressing together opposed surfaces of said packed container further to compact said product and eliminate air voids and simultaneously freezing said product into a frozen block in said container.

16. A process of preparing a food product which consists in packing the same in a container, placing at least two sides of said packed container in contact with flat heat conductive members, maintaining said surfaces firmly in contact with said container and maintaining said members at a sufficiently low temperature to quick freeze said product in said container.

17. A process of preparing a food product which consists in packaging the product in a package for delivery, applying pressure to said package to flatten the opposite surfaces of said product, and quick freezing said packaged product by conduction uniformly applied over substantially the entire area of said flattened surfaces while said pressure is maintained.

18. A process of preparing a food product which consists in packaging the same in a package for delivery, applying continued pressure to said package to flatten the product, and simultaneously freezing said product in said package by conduction uniformly applied over substantially the entire flattened surfaces of said product.

19. The method of freezing food products which consists in passing the food through a refrigerating zone while applying heat conductive members to opposite sides thereof, subjecting said conductive members to a bath of refrigerating medium from which the food is shielded, and simultaneously applying pressure to said food.

20. The method of treating a food product which consists in forming the same into a block, passing the block through a refrigerating zone while applying heat conductive members to the opposite sides thereof, and subjecting said members to the action of a refrigerating medium while shielding the block therefrom.

21. The method of treating a food product which consists in passing the product past a refrigerating medium which simultaneously extracts heat from opposite sides thereof and at the same time applying pressure to the food and shielding it from the refrigerating medium.

22. The method of packing and preserving food which consists in first packaging the food, then passing said package through a refrigerating zone in which heat conductive members are applied to opposite sides of the package, and subjecting said conductive members to a refrigerating medium while shielding the package therefrom.

23. The method of refrigerating and preserving food products which consists in packaging the same, passing the packages past a refrigerating medium which simultaneously extracts heat from two sides thereof, and at the same time applying pressure to the package and shielding the package from the refrigerating medium.

24. The method of packaging and preserving food which consists in first packaging the food, then passing the package through a refrigerating zone in which heat conductive members are applied to opposite sides of the package, and subjecting said conductive members to a refrigerating medium while shielding the package therefrom and simultaneously applying pressure to said package.

25. The method of packaging and preserving food products which consists in first packaging the products in a container for delivery and passing the container past a refrigerating medium which extracts heat simultaneously from two sides thereof while shielding the container from said refrigerating medium.

26. The method of preparing a food product which consists in packing the same in the container in which it is to be marketed, engaging the bottom surface of the packed container by a heat conductive member, engaging the top surface of the container by a second heat conductive member, and subjecting the packed container to a freezing temperature through the medium of said engaging heat conductive members for an interval sufficient completely to freeze said product into a frozen block in said container.

In testimony whereof, I have signed my name to this specification.

CLARENCE BIRDSEYE.

DISCLAIMER 1,773,079.—*Clarence Birdseye*, Gloucester, Mass. METHOD FOR PREPARING FOOD PRODUCTS. Patent dated August 12, 1930. Disclaimer filed March 17, 1943, by the assignee, *General Foods Corporation*.

Hereby enters this disclaimer to claims 1 to 9, inclusive, 14, 15, and 16, and 18 to 26, inclusive, in said specification.

[*Official Gazette April 13, 1943.*]